United States Patent
Martin

(10) Patent No.: US 7,132,825 B2
(45) Date of Patent: Nov. 7, 2006

(54) DETECTION DEVICE

(75) Inventor: Nicolas Martin, Amay (BE)

(73) Assignee: Universite de Liege, Liege (BE)

( * ) Notice: Subject to any disclaimer, the term of this patent is extended or adjusted under 35 U.S.C. 154(b) by 174 days.

(21) Appl. No.: 10/486,269

(22) PCT Filed: Aug. 6, 2002

(86) PCT No.: PCT/EP02/08814

§ 371 (c)(1),
(2), (4) Date: Feb. 9, 2004

(87) PCT Pub. No.: WO03/014675

PCT Pub. Date: Feb. 20, 2003

(65) Prior Publication Data
US 2004/0169507 A1 Sep. 2, 2004

(30) Foreign Application Priority Data
Aug. 8, 2001 (EP) .................................. 01203020

(51) Int. Cl.
G01B 7/14 (2006.01)
H01F 5/00 (2006.01)

(52) U.S. Cl. .................... 324/207.17; 324/207.18; 324/207.24

(58) Field of Classification Search ........... 324/207.11, 324/207.13, 207.15–207.18, 207.23–207.26, 324/160, 163, 173, 178, 67, 326; 310/168
See application file for complete search history.

(56) References Cited

U.S. PATENT DOCUMENTS

| 1,659,729 | A | * | 2/1928 | Gannett ....................... 310/168 |
| 3,246,219 | A | * | 4/1966 | Devol et al. ................. 318/569 |
| 3,290,487 | A | * | 12/1966 | Scott ........................... 235/450 |
| 3,401,284 | A | * | 9/1968 | French ......................... 310/168 |
| 3,617,874 | A | * | 11/1971 | Forster ......................... 324/241 |
| 3,906,339 | A | * | 9/1975 | Leisterer ................. 324/207.18 |
| 3,961,214 | A | | 6/1976 | Lokkart ....................... 310/155 |
| 4,717,874 | A | * | 1/1988 | Ichikawa et al. ....... 324/207.16 |
| 4,786,869 | A | * | 11/1988 | Kanai et al. ........... 324/207.18 |
| 4,945,274 | A | | 7/1990 | Pernpeintner ............... 310/256 |
| 5,010,298 | A | * | 4/1991 | Uemura ................. 324/207.19 |
| 5,115,194 | A | * | 5/1992 | Luetzow et al. .......... 324/207.2 |
| 5,117,181 | A | * | 5/1992 | Clergeot et al. ....... 324/207.18 |
| 5,293,031 | A | * | 3/1994 | Goto et al. .................. 235/449 |

(Continued)

FOREIGN PATENT DOCUMENTS

DE 3326476 A1 2/1985

(Continued)

Primary Examiner—Edward Lefkowitz
Assistant Examiner—Kenneth J. Whittington
(74) Attorney, Agent, or Firm—Jacobson Holman PLLC

(57) ABSTRACT

A device for detecting the displacement of an object comprising a ferromagnetic material, comprises a magnetic circuit generator provided with first and a second cores made of ferromagnetic material and an excitation coil and a measurement coil. The magnetic circuit generator is connected to a detecting unit designed to detect a reluctance variation brought about in the circuit by the displacement of the object and to deduce therefrom its position. In the device, the magnetic circuit generator comprises first and second transformers with open magnetic circuit, the transformers being juxtaposed and comprise each an axis extending across their respective core, the axes extending substantially perpendicular to the path. The excitation coil comprises two coils connected in series which form the primary windings of the first and second transformers. The measurement coil comprises two coils connected in series which form the secondary windings of the first and second transformers, the primary and secondary windings being connected in opposite phase.

7 Claims, 4 Drawing Sheets

U.S. PATENT DOCUMENTS 5,793,197 A * 8/1998 Shirai et al. ................. 324/160
6,208,135 B1 * 3/2001 Shattil ........................ 324/225
6,566,862 B1 * 5/2003 Goto et al. ............ 324/207.16

FOREIGN PATENT DOCUMENTS

JP         361086647 A  *  5/1986  ............ 324/207.18

* cited by examiner

DETECTION DEVICE

This is a nationalization of PCT/EP02/08814 filed Aug. 6, 2002 and published in French.

The present invention relates to a device for detecting movement of an object which contains ferromagnetic material and can move along a path, which device comprises a magnetic circuit generator which has a first and a second cores made of ferromagnetic material, an excitation coil and a measuring coil and is connected to a detection unit adapted to detect a reluctance variation produced in the magnetic circuit by the movement of the object and to deduce the position of the object therefrom.

A device of the above kind is disclosed in U.S. Pat. No. 5,117,181. In the prior art device, the magnetic circuit generator comprises two U-shaped ferromagnetic material cores disposed back-to-back in the same plane. The measuring coil is a single loop coil in opposite phase around the central part of each core. The excitation coil is wound in series around the two cores. The detection device is disposed so that the object moves perpendicularly to the plane containing the two cores. The object whose movement is to be detected consists of a series of elements made of ferromagnetic material disposed at a predetermined distance from each other. When the object moves along its path and when one of the elements approaches the branch of the core facing the path, the magnetic circuit formed by that core surrounded by the excitation coil is formed. Because an alternating current is injected into the excitation coil, it generates a magnetic field in the ferromagnetic cores. The elements that move along the path modify the flux induced in the magnetic circuit, thereby modifying its reluctance. The rate of movement of the object can then be determined by measuring this reluctance variation by means of the detector.

One disadvantage of the prior art device is that the magnetic circuit generator is of complex construction. This is because the way in which the excitation coil and the measuring coil are disposed necessitates covering the ferromagnetic material cores on each side with an, amagnetic material screening plate. Thus the excitation coil is separated from the measuring coil. This complexity therefore makes it necessary to construct the entire device without using the components that are generally employed to detect a magnetic field variation.

An object of the invention is to provide a movement detection device that is simpler to fabricate without reducing the accuracy of the measurement to be effected.

To this end, a device according to the invention is characterised in that the magnetic circuit generator comprises a first and a second open magnetic circuit transformers, said first transformer including the first core and the second transformer including the second core, said transformers being juxtaposed and each having an axis that extends through its respective core, said axes extending substantially-perpendicularly to said path, said excitation coil comprising a connection in series of two coils that form the primary coils of the first and second transformers, and said measuring coil comprising a connection in series of two coils that form the secondary coils of the first and second transformers, said secondary coils being connected in phase opposition. The choice of the first and second transformers allows the use of the components that are generally used. Since the transformers are open circuit and their axes are substantially perpendicular to the path along which the object moves, the movement of the object along the path closes the magnetic circuit when the object, which contains ferromagnetic material, crosses one of the axes. Given that the excitation coil forms the primary coils of both transformers, the voltage applied to the excitation coil induces a voltage in the secondary coils when the magnetic circuit is closed because of the movement of the object. This voltage induced in the secondary coils change as the object moves along its path. Since the secondary coils form the measuring coil, the measured change of voltage in the secondary coils enables the movement and thus the position of the object to be deduced. Thus using transformers allows reliable measurement of the position of the object.

A first embodiment of a detection device according to the invention is characterised in that the transformers are separated from the object by a metal wall that is a poor conductor of electrical current. Thus movement can also be detected through a wall. An application of this kind is particularly useful if the object moves in a medium that must remain isolated, for example a chemical or nuclear reactor.

A second embodiment of a detection device according to the invention is characterised in that each transformer includes a ferrite screw on each of said axes, adapted to compensate a difference of magnetic characteristics in the magnetic circuit of each transformer. Using ferrite screws provides a simple and reliable solution for compensating the magnetic characteristic difference.

A third embodiment of a detection device according to the invention is characterised in that said primary coils are connected to a first input of the detector and the opposite phase secondary coils are connected to a second input of the detector, which includes an operational amplifier connected to the second input and an output of which is connected via a phase shifter to a first input of a multiplier which has a second input connected to the first input of the detector, an output of the multiplier being connected to a low-pass filter. This embodiment of the detector reliably determines the position of the object from the excitation voltage and the measured voltage of the secondary coils.

The detector preferably comprises linearisation means connected to the output of the low-pass filter and adapted to linearise the output signal of the filter. This linearises the measured value and determines the position of the object in a linear manner, which corresponds to its actual position. A particular feature of those linearisation means is compensation of the effects of ambient temperature variations that can influence the value of the filter output signal. The coils of the transformers used in the device of the invention consist of metal wires, generally copper or steel wires, so the effects of temperature on the physical properties of the wires are reflected in the signal measured at the secondary coils of the transformers and thence on said output signal of the filter. The linearisation means can consist in the application of an interpolation polynomial, preferable a $6^{th}$ order polynomial, to the output signal of the filter, either directly or subsequent to processing of the signal.

The oscillator is preferably adapted to produce a frequency that is less than 50 kHz, more preferably less than 30 kHz, and even more preferably from 3 kHz to 6 kHz. Experiments have shown that these frequency values give a reliable result.

The invention is described in more detail next with reference to the drawings, which show preferred embodiments of a detection device according to the invention. In the drawings:

FIGS. 2b and 2c show the measured voltage in the secondary coils before and after linearisation;

In the drawings, the same reference numbers are allocated to the same or similar members.

Figure 1:
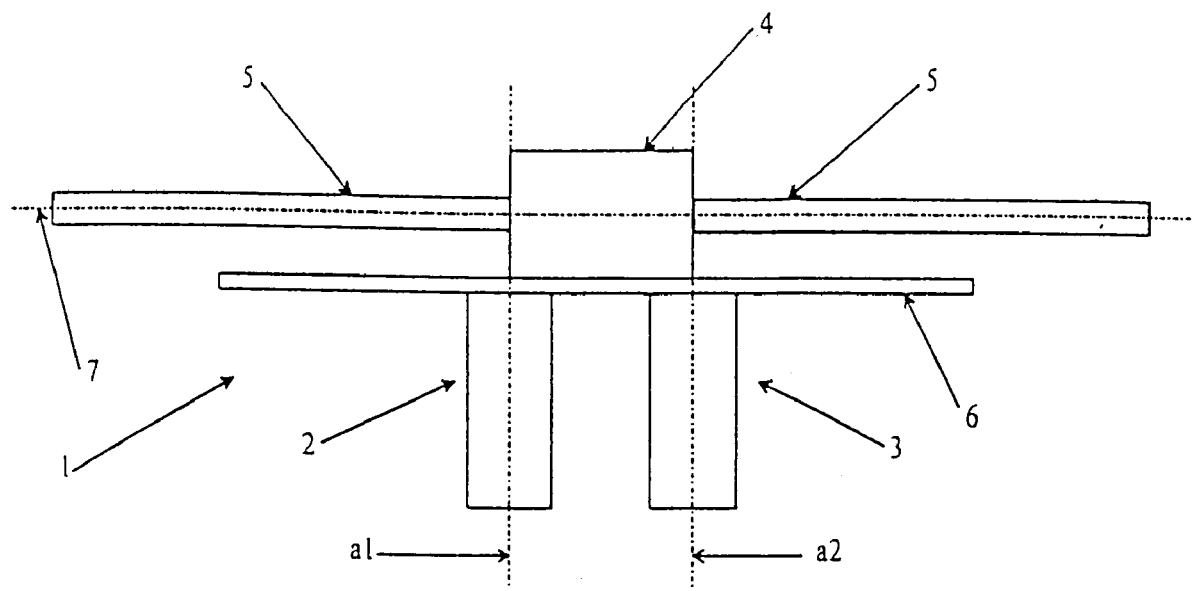
FIG. 1 is a general view of one embodiment of a device according to the invention.
Figure 2:
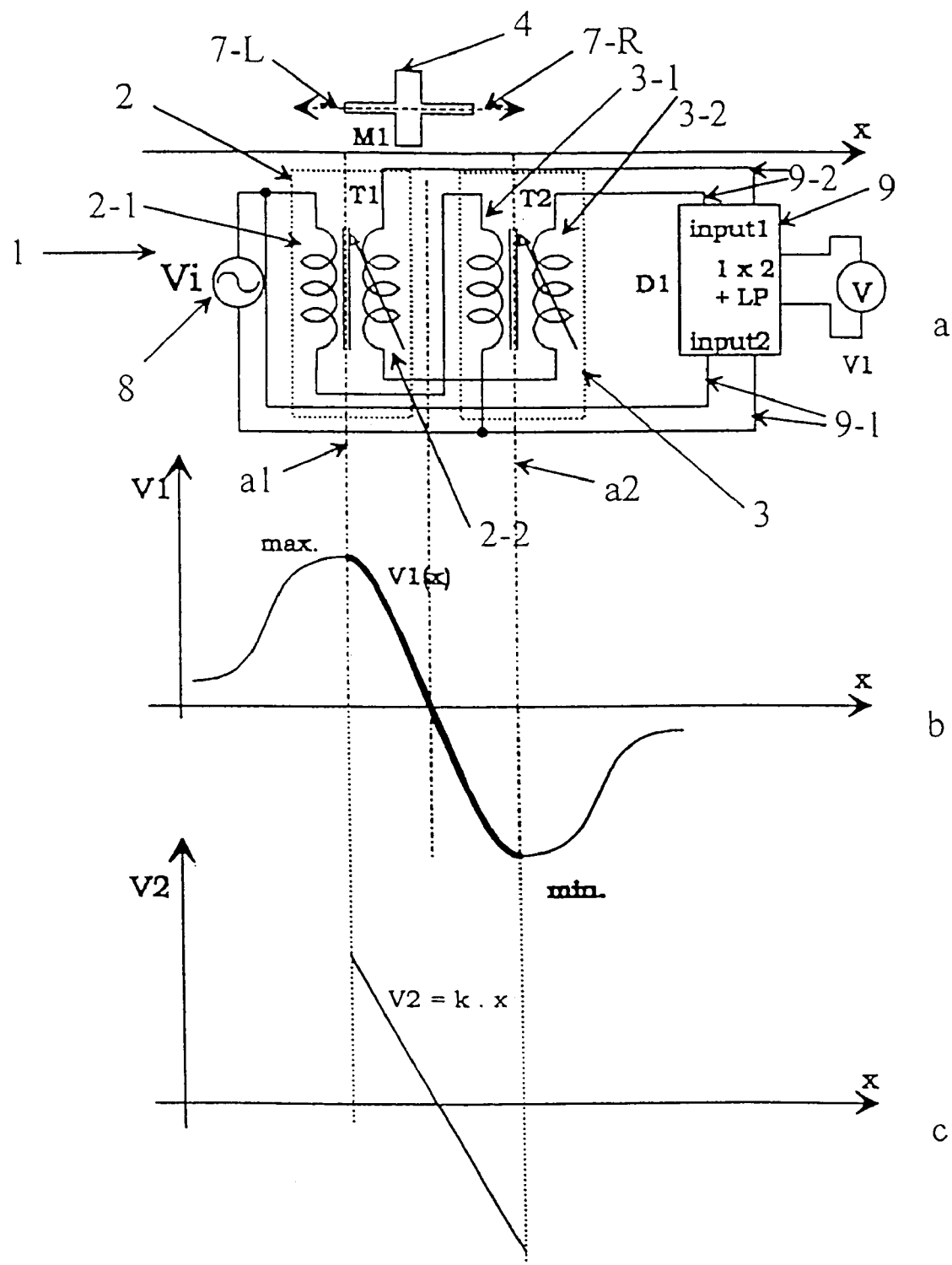
FIG. 2 is a diagram showing one embodiment of a device according to the invention.

As shown in FIG. 1, the device 1 in accordance with the invention for detecting movement of an object 4 comprises first and second transformers 2 and 3 that are juxtaposed and parallel to each other. Each transformer has a ferromagnetic material core and is part of a magnetic circuit generator. As shown in FIG. 2, a first axis a1 and a second axis a2 extend through the first core and the second core of the first and second transformers, respectively. The two transformers have an open magnetic circuit and their axes are substantially perpendicular to the path 7 that the object 4 takes when it moves on the support 5. Thus the axes a1 and a2 intersect the trajectory of the object.

Like the cores of the transformers 2 and 3, the object 4 contains ferromagnetic material. The support 5 is made of an amagnetic material so as not to interfere with the magnetic circuit generator (see below). In the embodiment shown in FIG. 1, a metal wall 6, which is a poor conductor of electrical current, separates the object 4 from the transformers 2 and 3. The movement of the object 4 can be detected through this wall. However, the presence of this wall is not indispensable for the operation of the detection device.

As shown in FIG. 2a, the primary coils 2-1 and 3-1 of the first and second transformers are connected in series. The secondary coils 2-2 and 3-2 of the two transformers are also connected in series. The primary coils form an excitation coil and the secondary coils form a measuring coil. An AC voltage source 8 driven by an oscillator is connected to the primary coils and to a first input 9-1 of a detection unit 9. The oscillator preferably supplies a frequency from 3 kHz to 6 kHz. A second input 9-2 of the detector 9 is connected to the secondary coils, which are connected with the opposite phase relative to the primary coils.

The two transformers 2 and 3 each include a ferrite screw (indicated by the arrow in the secondary coils) on the axis of the primary coil and the secondary coil and adapted to compensate any difference of magnetic characteristics in the magnetic circuit of each transformer.

To determine the position of the object 4, which moves either toward the left (7-L) or toward the right (7-R) along the path 7, a sinusoidal voltage is applied to the primary coils 2-1 and 3-1 of the transformers by the source 8. Because the transformers have an open magnetic circuit and their axes a1 and a2 intersect the trajectory of the object, which contains ferromagnetic material, the object crossing one of the axes a1 and a2 closes the magnetic circuit with that axis. This closure of the magnetic circuit causes the voltage Vi applied to the primary coils, which form an excitation circuit, to induce a voltage Vs in the secondary coils, which form a measuring circuit. Thus the movement of the object varies the reluctance in the magnetic circuit of the transformers. Measuring this reluctance variation enables the detection unit 9 to determine the relative or absolute position of the object on its trajectory. The direction of movement is detected by virtue of the presence of the two transformers with the coils connected in series.

Figure 3:
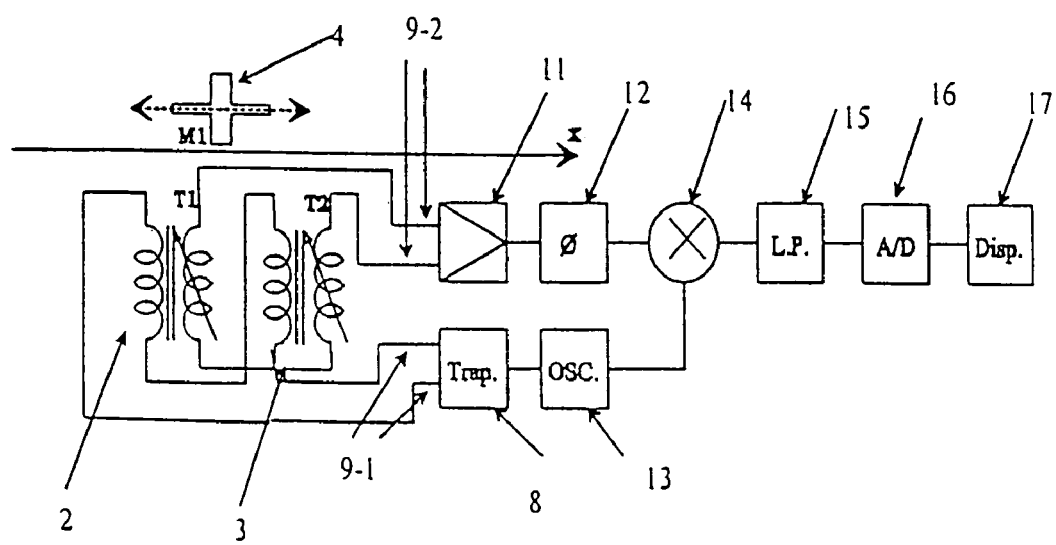
FIG. 3 is a diagram showing the device with its detector.

The voltage Vs induced in the secondary coils 2-2 and 3-2 is fed to the second input 9-2 of the detection unit. This voltage has a small phase shift relative to the excitation voltage (Vi) applied to the input 9-1 of the detection unit 9. FIG. 3 shows a preferred embodiment of the detection unit. The secondary coils are connected to an operational amplifier 11 whose output is connected to a phase shifter 12. The primary coils are connected to a voltage generator that is driven by an oscillator 13 and whose trapezium-shaped output signal is also applied to a second input of a multiplier 14. A first input of the multiplier 14 is connected to the output of the phase shifter 12. An output of the multiplier 14 is connected to an input of a low-pass filter 15 whose output is connected via an analog-to-digital converter 16 to a display unit 17 adapted to display the position of the object.

Since the secondary coils are connected to the operational amplifier 11 with opposite phases, the operational amplifier operates on the result of a subtraction. The multiplier 14 multiplies the voltages Vi and Vs and thus functions as a synchronous detector. The low-pass filter 15 is used to eliminate the component f1+f2 of the frequencies supplied to the multiplier. This is because the multiplication of the signals f1 and f2 has produced two components f1=f2 and f1−f2. Since in the present example the frequencies f1 and f2 are equal, the result obtained is 2f1 and 0 (DC). The DC signal thus allows the movement to be determined.

Figure 4:
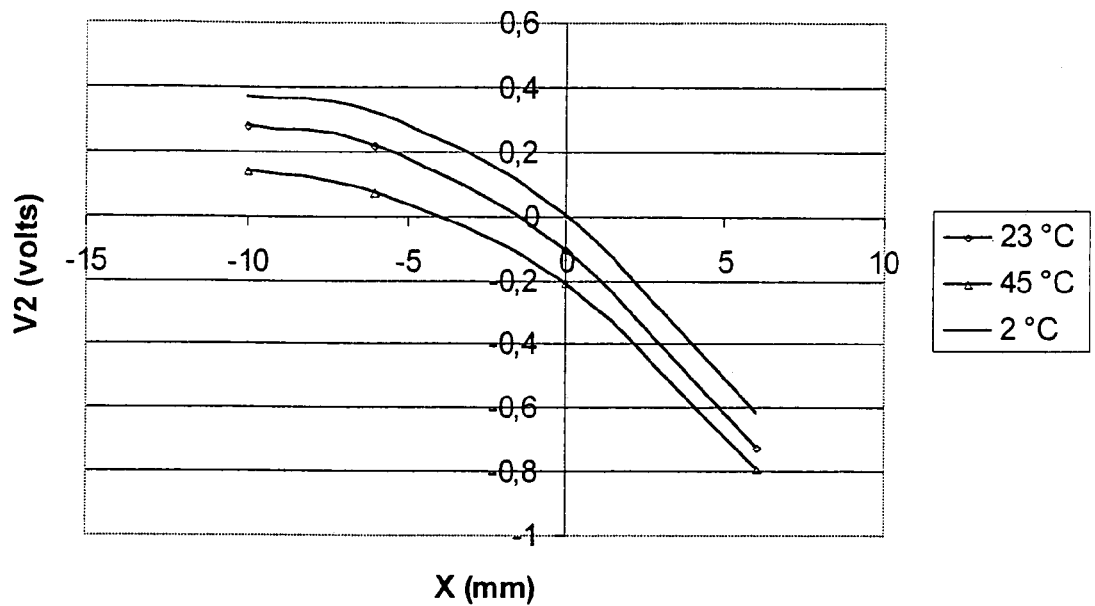
FIGS. 4 and 5 show the movement and rotation of the object with the aid of a graph.

To obtain a movement value, it is necessary to linearise the signal V1 obtained at the output of the low-pass filter and shown in FIG. 2b. To this end an interpolation polynomial, preferably of the $6^{th}$ order, is applied to the digital signal supplied at the output of the analog-to-digital converter 16. The result V2 of applying this linearisation to the signal V1 is shown in FIG. 2c. The voltage V2 is then equal to a constant k multiplied by the position x of the object. From this value the position x can be determined. FIG. 4 shows the position x of the object as a function of the value V2 that has been determined.

Figure 5:
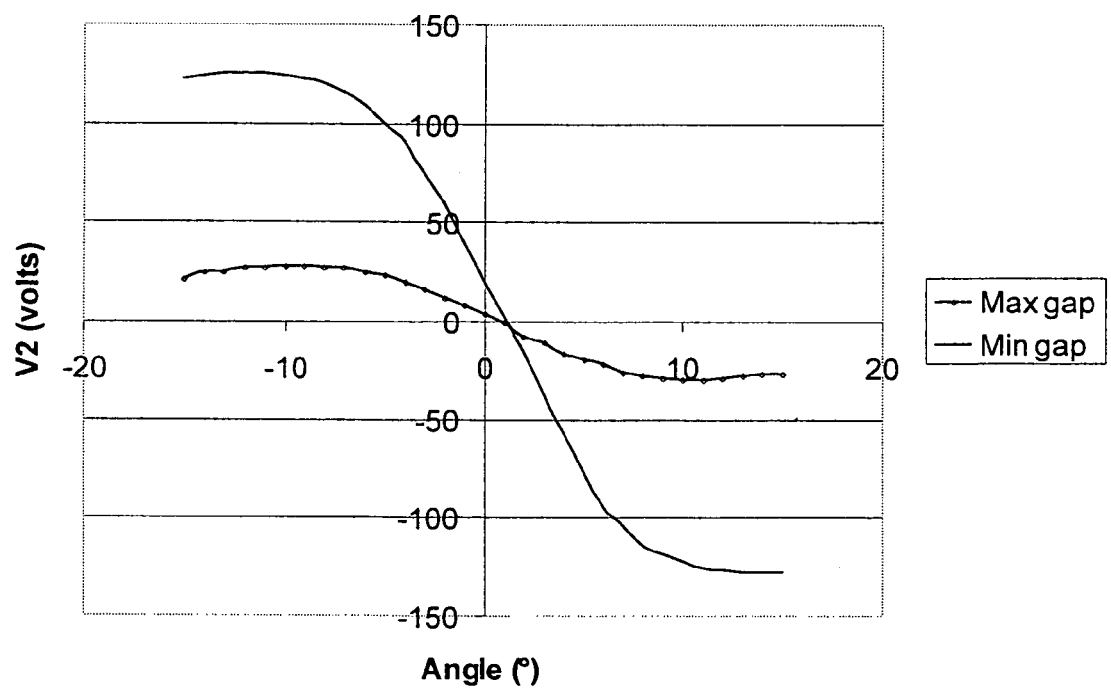

As shown in FIG. 4, the position x=0 is preferably centrally between the axes a1 and a2. FIG. 5 shows the rotation of the object, which can also be determined from the voltage V2, in a similar manner to determining the linear movement of the object.

Figure 6:
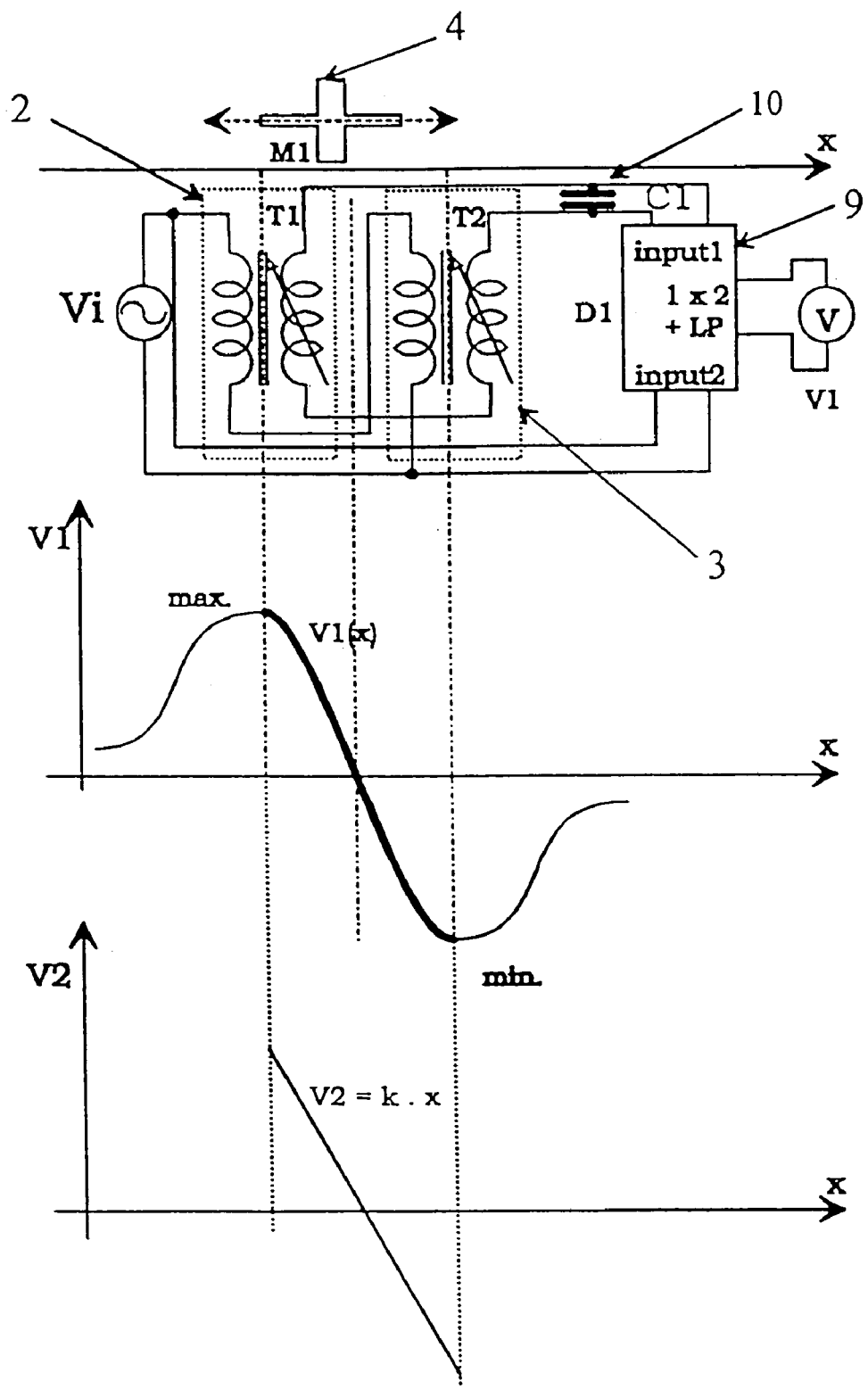
FIG. 6 is a diagram showing another embodiment of a device according to the invention.

FIG. 6 shows another embodiment of a device according to the invention. It differs from that shown in FIG. 2 by the connection of a capacitor 10 in parallel with the secondary coils. The value of the capacitor is chosen to produce a parallel resonant circuit with the coils 2-2 and 3-2 of the secondary coils. Adding this capacitor raises the level of the wanted signal prior to synchronous detection and increases the frequency for reasons of response time.

The invention claimed is:

1. A device for detecting movement of an object which contains ferromagnetic material and can move along a path, such device includes a magnetic circuit generator which has a first and a second elongated and straight cores made of ferromagnetic material, an excitation coil and a measuring coil, said generator is connected to a detection unit adapted to detect a reluctance variation produced in the circuit by the movement of the object and to deduce a position of the object therefrom, which device is characterised in that the magnetic circuit generator comprises a first and a second open magnetic circuit transformers, said first transformer including the first core and the second transformer including the second core, said transformers being juxtaposed and each having an axis that extends through its respective core, said axes extending substantially perpendicularly to said path, said excitation coil comprising a connection in series of two coils that form the primary coils of the first and second transformers, and said measuring coil comprising a connection in series of two coils that form the secondary coils of the first and second transformers, said secondary coils being connected in phase opposition and a capacitor being in parallel connection with the secondary coils; characterised in that the transformers are separated from the object by a metal wall that is a poor conductor of electrical current.

2. The detection device according to claim 1, characterised in that said object is mounted on an amagnetic material support.

3. The detection device according to claim 1, characterised in that each transformer includes a ferrite screw on each of said axes and adapted to compensate any difference of magnetic characteristic in the magnetic circuit of each transformer.

4. A device for detecting movement of an object which contains ferromagnetic material and can move along a path, such device includes a magnetic circuit generator which has a first and a second elongated and straight cores made of ferromagnetic material, an excitation coil and a measuring coil, said generator is connected to a detection unit adapted to detect a reluctance variation produced in the circuit by the movement of the object and to deduce a position of the object therefrom, which device is characterised in that the magnetic circuit generator comprises a first and a second open magnetic circuit transformers, said first transformer including the first core and the second transformer including the second core, said transformers being juxtaposed and each having an axis that extends through its respective core, said axes extending substantially perpendicularly to said path, said excitation coil comprising a connection in series of two coils that form the primary coils of the first and second transformers, and said measuring coil comprising connection in series of two coils that form the secondary coils of the first and second transformers, said secondary coils being connected in phase opposition and a capacitor being in parallel connection with the secondary coils; characterised in that said primary coils are connected to a first input of the detector and the secondary coils are connected in phase opposition to a second input of the detector, which includes an operational amplifier connected to the second input and an output of which is connected via a phase shifter to a first input of a multiplier which has a second input connected to the first input of the detector, an output of the multiplier being connected to a low-pass filter.

5. The detection device according to claim 4, characterised in that the detector includes linearization means connected to the output of the low-pass filter and adapted to linearize the output signal of the filter.

6. The detection device according to claim 4, characterised in that it includes an AC voltage source driven by an oscillator and connected to the primary coils.

7. The detection device according to claim 6, characterised in that said oscillator is adapted to produce a frequency from 3 kHz to 6 kHz.

* * * * *